March 7, 1933.  T. J. FEGLEY ET AL  1,900,807
CHRISTMAS TREE HOLDER
Filed May 3, 1932  2 Sheets-Sheet 1

Inventors:
Thomas J. Fegley
George O. Leopold
by their Attorneys
Howson & Howson March 7, 1933.　　T. J. FEGLEY ET AL　　1,900,807
CHRISTMAS TREE HOLDER
Filed May 3, 1932　　2 Sheets-Sheet 2
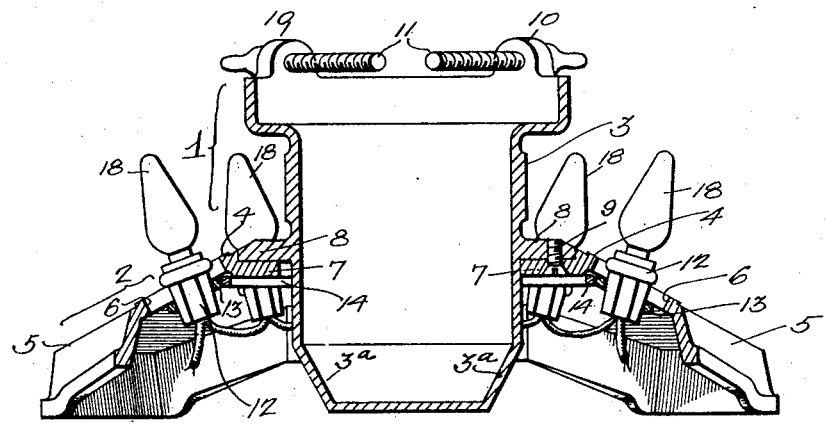
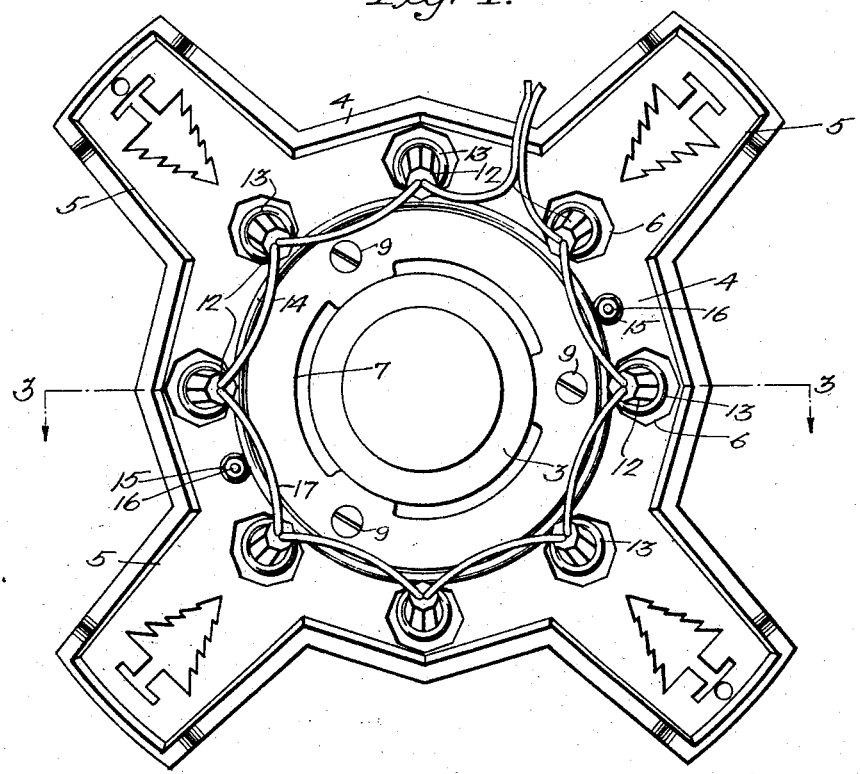
Inventors:
Thomas J Fegley
George O. Leopold
by their Attorneys
Howson & Howson Patented Mar. 7, 1933

1,900,807

UNITED STATES PATENT OFFICE

THOMAS J. FEGLEY AND GEORGE O. LEOPOLD, OF PHILADELPHIA, PENNSYLVANIA, ASSIGNORS TO NORTH BRO'S M'F'G CO., OF PHILADELPHIA, PENNSYLVANIA, A CORPORATION OF PENNSYLVANIA

CHRISTMAS TREE HOLDER

Application filed May 3, 1932. Serial No. 609,016.

One object of our invention is to make a substantial Christmas tree holder, which will firmly support the lower end of the tree, and which can be made economically.

Another object of the invention is to make that portion of the tree holder in which the end of the tree is inserted conical, so that the holder will accommodate trees having butts of different diameters.

A further object of the invention is to provide means for illuminating the base of the tree, said means being carried by the holder.

A still further object of the invention is to make the base of the tree holder with a series of perforations therein through which the electric lamp sockets project, the sockets being detachably secured to the underside of the base.

In the accompanying drawings:

Fig. 3 is a transverse sectional view on the line 3—3, Fig. 4; and

Fig. 4 is an inverted plan view of the holder.

Figure 2:
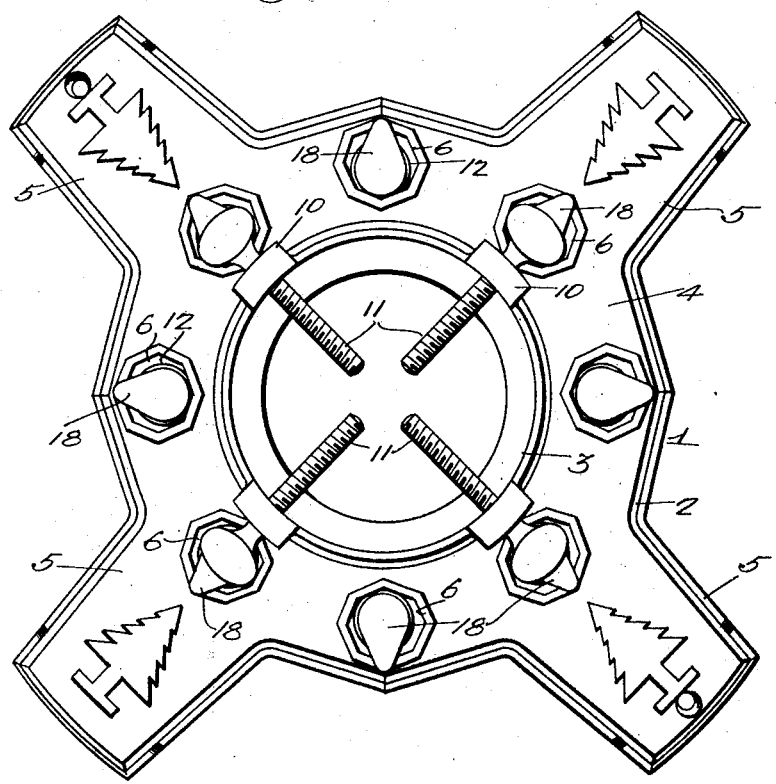
Fig. 2 is a plan view.
Figure 1:
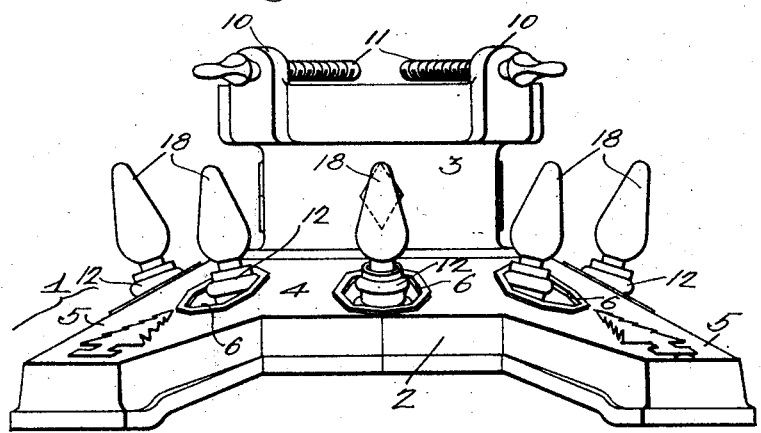
Fig. 1 is a side view of our improved Christmas tree holder.

Referring to the drawings: The holder 1 is preferably a casting and is made in two parts, a base 2 and a receptacle 3 for the lower end of the tree. The base 2 consists of a ring 4 having legs 5. The legs and rings may be shaped and ornamented in any suitable manner. In the ring is a series of openings 6. These openings in the present instance are octagonal but may be round or other shapes if desired.

When electric lights are used, the sockets for the bulbs project through these openings and are secured in any suitable manner to the base. The ring 4 of the base has a depressed internal flange 7, on which rests an external flange 8 of the receptacle 3. The receptacle 3 extends through the ring as shown in Fig. 3 and is secured to the base by screws 9, which extend through openings in the flange 7 and into threaded openings in the flange 8, firmly securing the receptacle to the base. The bottom of the receptacle is closed, to allow water to be placed in the receptacle to provide moisture for the tree.

At the upper end of the receptacle in the present instance is a series of lugs 10, through which extend screws 11 which can be screwed tightly against the trunk of the tree to firmly retain the tree in the holder. Other means may be used in place of these screws for securing the tree in the holder without departing from the essential features of the invention. The bottom of the receptacle 3 is conical as at 3a, to form a bottom support for the butt end of the tree, so that trees having different diameters of trunks will accommodate themselves to the holder, and when the screws at the upper end of the holder are screwed tightly against the tree the upper and lower supports hold the tree firmly in position. The sockets 12 for the electric light bulbs are mounted in holders 13 on a carrying ring 14, which has eyes 15 through which extend the screw bolts 16, which secure the ring to the underside of the base 2. These several sockets are connected in series by wires 17, and on the end of the feed wire is the usual plug, which can be inserted in a socket. The lamps 18 are mounted in the sockets in the usual manner. By this arrangement the Christmas tree support can be sold without the ring 14 and the sockets and lamps, and if anyone wishes to illuminate the base of the tree the ring can be purchased separately and mounted in position so that the sockets will project through the openings 6 in the base, although the general practice is to sell the Christmas tree holder complete with the sockets and lamps.

We claim:

The combination in a Christmas tree holder, of a base consisting of a ring and inclined radiating legs for supporting the holder; a series of openings in the ring, said ring having a depressed internal flange; a receptacle extending through the ring and having an external flange; means securing the flange of the base to the flange of the receptacle, said receptacle having lugs at its upper end, the lugs having threaded openings; and screws extending through the threaded openings and arranged to clamp the trunk of the tree to the receptacle.

THOMAS J. FEGLEY.
GEORGE O. LEOPOLD.